(12) United States Patent
Gotoh et al.

(10) Patent No.: US 11,349,175 B2
(45) Date of Patent: May 31, 2022

(54) SEPARATOR FOR LEAD ACID STORAGE BATTERIES, AND LEAD ACID STORAGE BATTERY

(71) Applicant: HITACHI CHEMICAL COMPANY, LTD., Tokyo (JP)

(72) Inventors: Akihito Gotoh, Tokyo (JP); Tasuku Asai, Tokyo (JP); Hiroshi Kakuno, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 44 days.

(21) Appl. No.: 16/768,860

(22) PCT Filed: Nov. 8, 2018

(86) PCT No.: PCT/JP2018/041526
§ 371 (c)(1),
(2) Date: Jun. 1, 2020

(87) PCT Pub. No.: WO2019/111628
PCT Pub. Date: Jun. 13, 2019

(65) Prior Publication Data
US 2021/0151831 A1 May 20, 2021

(30) Foreign Application Priority Data

Dec. 5, 2017 (JP) .............................. JP2017-233359

(51) Int. Cl.
*H01M 50/446* (2021.01)
*H01M 50/449* (2021.01)
(Continued)

(52) U.S. Cl.
CPC ......... *H01M 50/446* (2021.01); *H01M 10/06* (2013.01); *H01M 50/44* (2021.01);
(Continued)

(58) Field of Classification Search
CPC .. H01M 50/446; H01M 50/44; H01M 50/491; H01M 50/449; H01M 50/437; H01M 10/06; H01M 2220/20
See application file for complete search history.

(56) References Cited

U.S. PATENT DOCUMENTS

| 2003/0054233 A1* | 3/2003 | Zucker ................ H01M 50/449 |
| | | 429/251 |
| 2013/0101887 A1* | 4/2013 | Sugiyama ........... H01M 50/449 |
| | | 429/144 |

FOREIGN PATENT DOCUMENTS

| JP | H11-260335 A | 9/1999 |
| JP | 2002-151033 A | 5/2002 |

(Continued)

OTHER PUBLICATIONS

JP-2002151034-A EPO machine generated English translation (Year: 2002).*

*Primary Examiner* — Christopher P Domone
*Assistant Examiner* — Kimberly Wyluda
(74) *Attorney, Agent, or Firm* — Hauptman Ham, LLP

(57) ABSTRACT

A separator 100 is disposed between a positive electrode and a negative electrode in a lead acid storage battery including the positive electrode and the negative electrode, in which the separator 100 contains a glass fiber and an organic binder, the separator 100 includes a first layer 110a that is in contact with the positive electrode, and a second layer 110b that is in contact with the negative electrode, an average pore diameter of the first layer 110a is larger than an average pore diameter of the second layer 110b, and a thickness of the first layer 110a is equal to or less than the half of the overall thickness of the separator 100.

14 Claims, 5 Drawing Sheets

(51) Int. Cl.
*H01M 10/06* (2006.01)
*H01M 50/437* (2021.01)
*H01M 50/491* (2021.01)
*H01M 50/44* (2021.01)

(52) U.S. Cl.
CPC ....... *H01M 50/449* (2021.01); *H01M 50/491* (2021.01); *H01M 50/437* (2021.01); *H01M 2220/20* (2013.01)

(56) References Cited

FOREIGN PATENT DOCUMENTS

| | | | |
|---|---|---|---|
| JP | 2002151034 A | * | 5/2002 |
| JP | 2013-206571 A | | 10/2013 |
| JP | 2017-033863 A | | 2/2017 |

* cited by examiner

SEPARATOR FOR LEAD ACID STORAGE BATTERIES, AND LEAD ACID STORAGE BATTERY

CROSS REFERENCE TO RELATED APPLICATION

This present application is a national stage filing under 35 U.S.C § 371 of PCT application number PCT/JP2018/041526 filed on Nov. 8, 2018, which designates the United States and was published in Japan, and which claims priority to Japanese Patent Application No. 2017-233359 filed on Dec. 5, 2017 in the Japanese Patent Office. The disclosures of the above-listed applications are hereby incorporated by reference herein in their entireties.

TECHNICAL FIELD

The present invention relates to a separator for lead acid storage batteries, and a lead acid storage battery.

BACKGROUND ART

Currently, a maintenance free control valve type lead acid storage battery is used for uninterruptible power sources and power storage applications. In addition, in recent, the control valve type lead acid storage battery is also used for cycle applications of electric vehicles or the like. In the cycle applications like this, high output is required. To deal with the high output, the number of electrodes in a battery jar is increased by reducing the thickness of an electrode, the thickness of a separator, and the like.

As a separator of the control valve type lead acid storage battery, a sheet using glass fiber is used, and the separator also plays a role of retaining sulfuric acid that is an electrolytic solution and supplying the electrolytic solution to a positive electrode and a negative electrode. The separator retains the electrolytic solution at the inside thereof as described above, and accordingly, lead sulfate easily elutes in the separator in a discharge step called "battery jar formation" in a battery manufacturing step, and there is a problem that short-circuit (penetration short-circuit) is likely to occur due to charge and discharge when reducing the thickness of the separator. Therefore, currently, a relatively thick separator (separator having a thickness of several mm) is used to prevent the penetration short-circuit, and it is difficult to reduce the thickness of the separator.

With regard to the problem, Patent Literature 1 described below suggests a separator in which suppression of the penetration short-circuit and reduction in thickness are compatible with each other by adding an inorganic filler to glass fiber. In addition, Patent Literature 2 described below suggests a separator obtained by joining the surfaces, on which an inorganic filler is unevenly distributed, of two glass sheets to each other, in which the inorganic filler is unevenly distributed at the surface on one side of the glass sheet.

CITATION LIST

Patent Literature

Patent Literature 1: Japanese Unexamined Patent Publication No. H11-260335
Patent Literature 2: Japanese Unexamined Patent Publication No. 2002-151033

SUMMARY OF INVENTION

Technical Problem

However, in the method of adding the inorganic filler to the separator as in Patent Literature 1 and Patent Literature 2, pores in the glass sheets are clogged, and thus there is a problem that it is difficult to retain an electrolytic solution. Therefore, with respect to a separator for lead acid storage batteries, it is required to prevent penetration short-circuit at the time of battery jar formation by another method in a case where the thickness of the separator is reduced.

An object of the invention is to provide a separator for lead acid storage batteries which is capable of preventing penetration short-circuit at the time of battery jar formation even in a case where the thickness of the separator is reduced, and a lead acid storage battery using the separator.

Solution to Problem

A lead acid storage battery of an aspect of the invention includes a positive electrode, a negative electrode, and a separator disposed between the positive electrode and the negative electrode, in which the separator contains a glass fiber and an organic binder, the separator includes a first layer that is in contact with the positive electrode, and a second layer that is in contact with the negative electrode, an average pore diameter of the first layer is larger than an average pore diameter of the second layer, and a thickness of the first layer is equal to or less than the half of the overall thickness of the separator.

A separator for lead acid storage batteries of another aspect of the invention is the separator to be disposed between a positive electrode and a negative electrode in a lead acid storage battery including the positive electrode and the negative electrode, in which the separator contains a glass fiber and an organic binder, the separator includes a first layer that is in contact with the positive electrode, and a second layer that is in contact with the negative electrode, an average pore diameter of the first layer is larger than an average pore diameter of the second layer, and a thickness of the first layer is equal to or less than the half of the overall thickness of the separator.

According to the separator for lead acid storage batteries, and the lead acid storage battery, it is possible to prevent penetration short-circuit at the time of battery jar formation even in a case where the thickness of the separator is reduced.

Advantageous Effects of Invention

According to the invention, in a lead acid storage battery, it is possible to prevent penetration short-circuit at the time of battery jar formation even in a case where the thickness of the separator is reduced.

DESCRIPTION OF EMBODIMENTS

Figure 1:
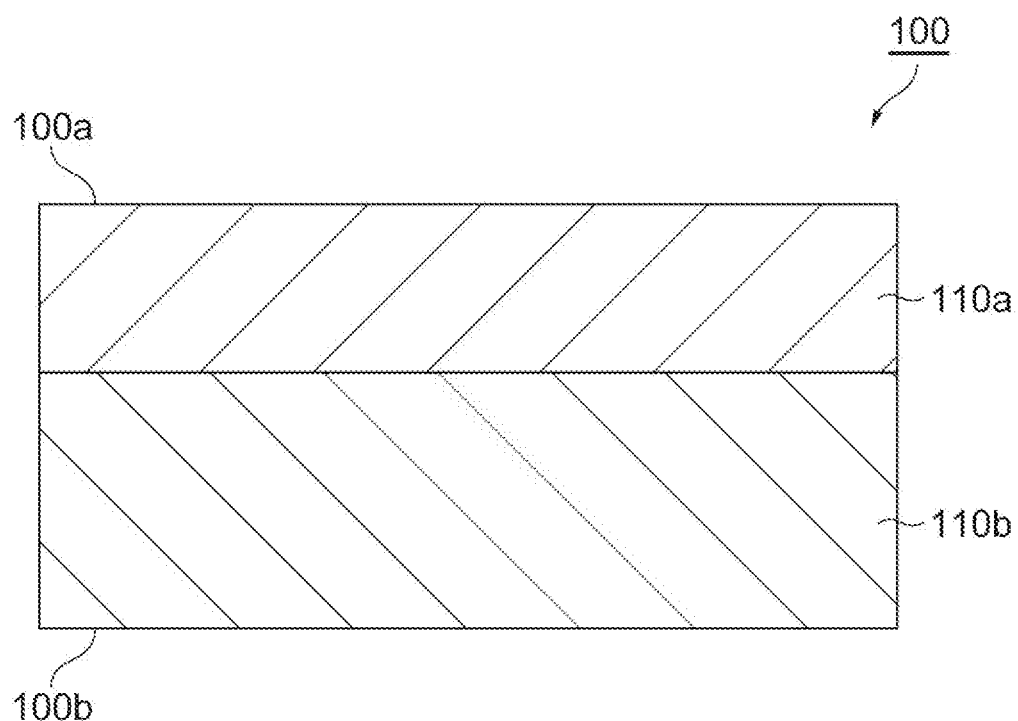
FIG. 1 is a cross-sectional view illustrating an example of a separator for lead acid storage batteries.

Hereinafter, an embodiment of the invention will be described, but the invention is not limited to the embodiment.

In this specification, a numerical value range expressed using "to" represents a range including numerical values described before and after "to" as a minimum value and a maximum value, respectively. In numerical value ranges described step by step in this specification, an upper limit value or a lower limit value of a numerical value range in an certain step may be arbitrarily combined with an upper limit value or a lower limit value of a numerical value range of another step. In the numerical value range described in this specification, an upper limit value or a lower limit value of the numerical value range may be substituted with values described in examples. "A or B" may include any one of A and B, and may include both A and B. As materials exemplified in this specification, one kind may be used alone or two or more kinds may be used in combination, unless otherwise stated. In a case where a plurality of materials corresponding to each component are present in a composition, the amount of each component contained in the composition represents a total amount of the plurality of materials present in the composition, unless otherwise stated. The terms "film" and "layer" include a structure having a shape which is formed on a part, in addition to a structure having a shape which is formed on the whole surface, when observed as a plan view. The term "step" includes not only an independent step but also a step by which an intended action of the step is achieved, though the step cannot be clearly distinguished from other steps. Specific gravity varies depending on a temperature, and thus the specific gravity is defined as specific gravity converted at 20° C. in this specification.

A separator for lead acid storage batteries of the embodiment (hereinafter, simply referred to as "separator" according to circumstances) is a separator that is to be disposed between a positive electrode and a negative electrode in a lead acid storage battery including the positive electrode and the negative electrode, the separator contains a glass fiber and an organic binder, the separator includes a first layer that is in contact with the positive electrode, and a second layer that is in contact with the negative electrode, an average pore diameter of the first layer is larger than an average pore diameter of the second layer, and a thickness of the first layer is equal to or less than the half of the overall thickness of the separator. That is, the separator of the embodiment is a separator for lead acid storage batteries which contains the glass fiber and the organic binder, the separator for batteries has a layer structure of two or more layers, average pore diameters of two layers disposed on an outer side are different from each other, and the first layer has the above-described predetermined thickness. A lead acid storage battery of the embodiment includes a positive electrode, a negative electrode, and a separator disposed between the positive electrode and the negative electrode, the separator contains a glass fiber and an organic binder, the separator includes a first layer that is in contact with the positive electrode, and a second layer that is in contact with the negative electrode, an average pore diameter of the first layer is larger than an average pore diameter of the second layer, and a thickness of the first layer is equal to or less than the half of the overall thickness of the separator. The separator of the embodiment has a structure obtained by laminating at least the first layer and the second layer.

According to the embodiment, in the lead acid storage battery, even in the case of reducing the thickness of the separator (for example, even in the case of a thickness of 1.2 mm or less), it is possible to prevent penetration short-circuit at the time of battery jar formation. In the embodiment, in a state in which the thickness of outer one layer is equal to or less than the half of the overall thickness of the separator, average pore diameters of outer two layers are different from each other, and thus, diffusivity of an electrolytic solution can be changed in the positive electrode and the negative electrode, and therefore, the penetration short-circuit at the time of battery jar formation can be prevented. According to the embodiment, without using an inorganic filler that clogs pores, the penetration short-circuit at the time of battery jar formation can be prevented even when reducing the thickness of the separator.

A reason of preventing the penetration short-circuit is assumed as follows. However, the reason is not limited to the following contents.

That is, typically, in lead acid storage batteries, lead sulfate is generated and specific gravity (sulfuric acid concentration) of the electrolytic solution decreases during discharge at the time of battery jar formation. In addition, when the lead sulfate elutes in the electrolytic solution and penetrates into the separator, the penetration short-circuit may occur.

In the embodiment, the average pore diameter of the first layer is larger than the average pore diameter of the second layer, and thus diffusion of the electrolytic solution in the first layer is faster in comparison to the second layer. In this case, in the second layer in which diffusivity is low, the electrolytic solution of which specific gravity decreases due to discharge is less likely to diffuse, in contrast, in the first layer in which diffusivity is high, the electrolytic solution of which specific gravity decrease due to discharge is likely to diffuse and specific gravity of the electrolytic solution is more likely to decrease in comparison to the second layer. According to this, a specific gravity difference of the electrolytic solution between the first layer and the second layer is likely to occur, in the first layer, the electrolytic solution of which specific gravity is small comes into contact (is mixed) with the electrolytic solution of which specific gravity is large on the second layer side, and thus specific gravity increases, and solubility of lead sulfate decreases, and therefore, lead sulfate precipitates. On the other hand, in the second layer, lead sulfate is less likely to precipitate.

In addition, in the embodiment, the thickness of the first layer is equal to or less than the half of the overall thickness of the separator. In this case, it is easy to suppress precipitation of lead sulfate in the entirety of the first layer, and the electrolytic solution of which specific gravity is low permeates into the second layer, and thus it is possible to suppress precipitation of lead sulfate in the second layer.

According to these, in the embodiment, it is possible to prevent the penetration short-circuit.

According to the embodiment, by reducing the thickness of the separator to increase the number of electrodes (electrode plates and the like) which are used, it is possible to increase capacity of the lead acid storage battery. Therefore, according to the embodiment, even when reducing the thickness of the separator, it is possible to prevent the penetration short-circuit at the time of battery jar formation, and it is possible to increase capacity of the lead acid storage battery.

The lead acid storage battery of the embodiment can be used as a control valve type lead acid storage battery. The lead acid storage battery of the embodiment can be used in an electric vehicle. Examples of the electric vehicle include a micro hybrid vehicle such as an ISS vehicle (start-stop system vehicle) and a power generation control vehicle. The electric vehicle of the embodiment includes the lead acid storage battery of the embodiment.

The positive electrode (for example, a positive electrode plate) includes a positive electrode current collector and a positive electrode active material filled portion, and the positive electrode current collector is filled with the positive electrode active material to form the positive electrode active material filled portion. The negative electrode (for example, a negative electrode plate) includes a negative electrode current collector and a negative electrode active material filled portion, and the negative electrode current collector is filled with the negative electrode active material to form the negative electrode active material filled portion. In this specification, a portion excluding the positive electrode current collector from the positive electrode after formation is referred to as "positive electrode active material", and a portion excluding the negative electrode current collector from the negative electrode after formation is referred as "negative electrode active material".

In the separator to be disposed between the positive electrode and the negative electrode, at least one kind selected from the group consisting of the first layer and the second layer can contain a glass fiber and an organic binder. The separator of the embodiment may not contain an inorganic filler, and may contain the inorganic filler. At least one kind selected from the group consisting of the first layer and the second layer may not contain the inorganic filler and may contain the inorganic filler.

In the separator of the embodiment, a retention rate of sulfuric acid having specific gravity of 1.28 or 1.31 at 20° C. may be 1200% or more, and a retention property of water may be 800% or less.

The separator of the embodiment is preferably composed of the first layer and the second layer from the viewpoint of easily preventing the penetration short-circuit. The separator of the embodiment may include a layer other than the first layer and the second layer between the first layer and the second layer.

In the embodiment, at least a part of the separator is disposed between the positive electrode and the negative electrode. The separator may have a bag shape. The separator may surround at least one kind selected from the group consisting of the positive electrode and the negative electrode. The separator may not surround the positive electrode and the negative electrode.

FIG. 1 is a cross-sectional view illustrating an example of the separator. A separator 100 of the embodiment includes a first layer 110a disposed on one surface 100a side of the separator 100, and a second layer 110b disposed on the other surface 100b side of the separator 100. The separator 100 is composed of the first layer 110a and the second layer 110b. The separator 100 is disposed between a positive electrode and a negative electrode. The first layer 110a is in contact with the positive electrode, and the second layer 110b is in contact with the negative electrode. One surface of the first layer 110a is in contact with the positive electrode, and the other surface of the first layer 110a is in contact with the second layer 110b. One surface of the second layer 110b is in contact with the negative electrode, and the other surface of the second layer 110b is in contact with the first layer 110a. An average pore diameter of the first layer 110a is larger than an average pore diameter of the second layer 110b.

Figure 2:
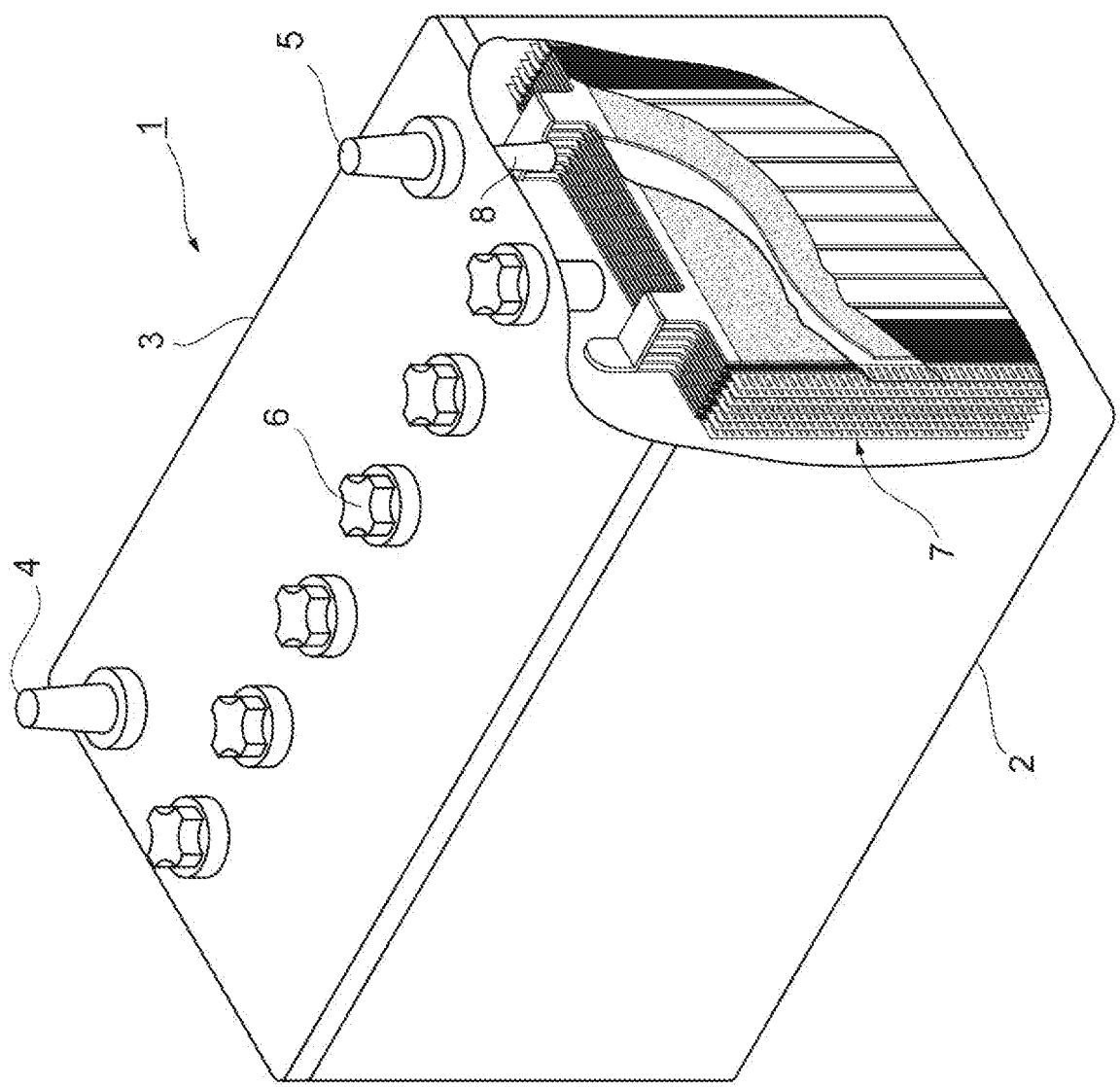
FIG. 2 is a perspective view illustrating an example of the lead acid storage battery.

FIG. 2 is a perspective view illustrating an example of a lead acid storage battery, and is a perspective view illustrating a whole configuration and an inner structure of the lead acid storage battery. A lead acid storage battery 1 illustrated in FIG. 2 includes a battery jar 2 of which an upper surface is opened, and a lid 3 that covers an opening of the battery jar 2. The battery jar 2 and the lid 3 are formed from, for example, polypropylene. The lid 3 is provided with a positive electrode terminal 4, a negative electrode terminal 5, and a vent plug 6 that clogs a liquid injection port provided in the lid 3.

An electrode group 7, a positive electrode column (not illustrated) that connects the electrode group 7 to a positive electrode terminal 4, a negative electrode column 8 that connects the electrode group 7 to a negative electrode terminal 5, and an electrolytic solution are accommodated inside the battery jar 2. For example, the electrolytic solution contains sulfuric acid. The electrolytic solution may further contain magnesium ions. For example, an electrolytic solution containing magnesium ions can be obtained by mixing sulfuric acid and magnesium sulfate.

Figure 3:
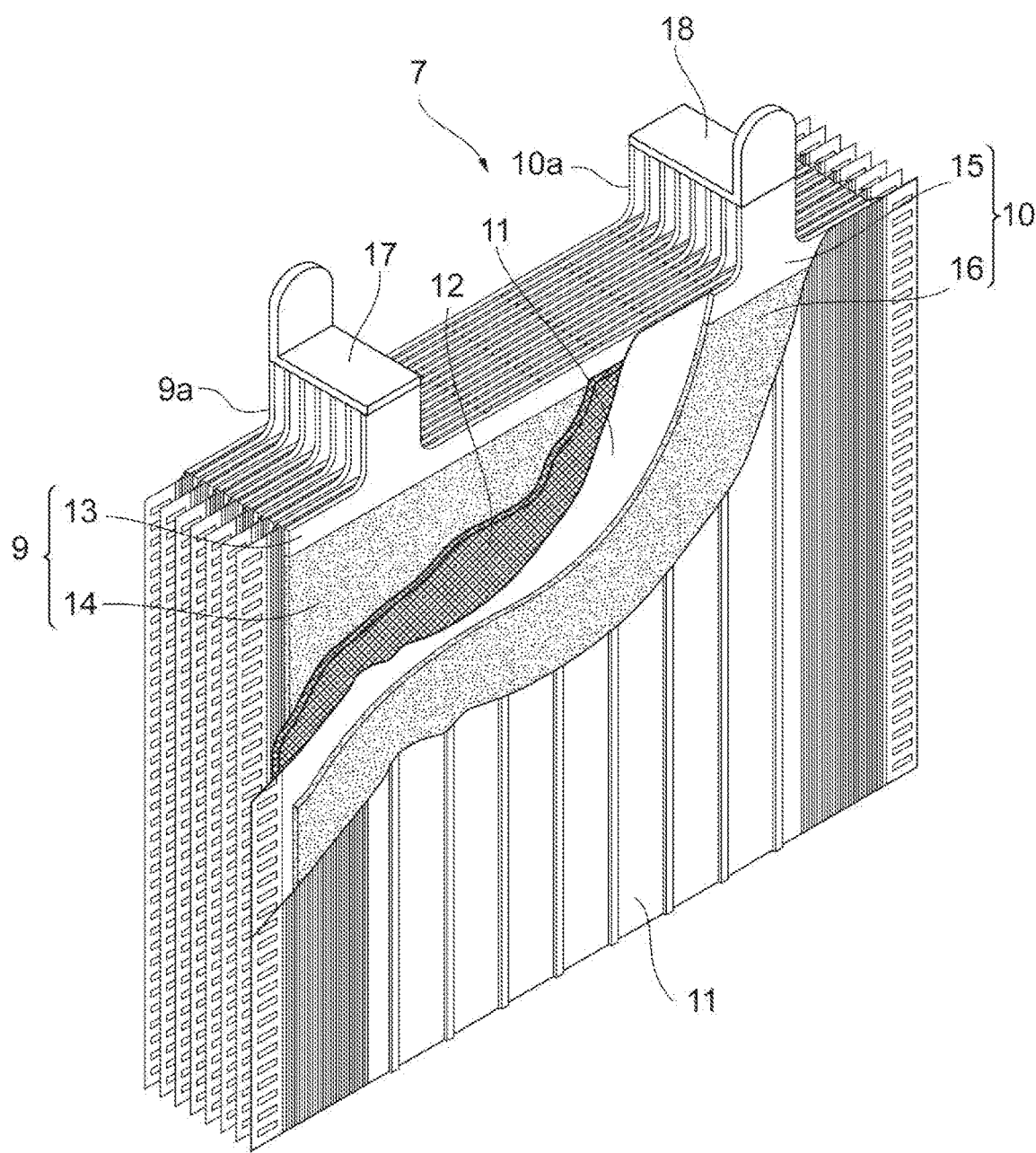
FIG. 3 is a perspective view illustrating an example of an electrode group of the lead acid storage battery.

FIG. 3 is a perspective view illustrating the electrode group 7. As illustrated in FIG. 3, the electrode group 7 includes a positive electrode plate (positive electrode) 9, a negative electrode plate (negative electrode) 10, and a separator 11 that is disposed between the positive electrode plate 9 and the negative electrode plate 10. The separator 11 includes a first layer that is in contact with the positive electrode plate 9 and a second layer that is in contact with the negative electrode plate 10, an average pore diameter of the first layer is larger than an average pore diameter of the second layer, and a thickness of the first layer is equal to or less than the half of the overall thickness of the separator 11. The positive electrode plate 9 includes a positive electrode current collector 13 and a positive electrode active material filled portion 14, and the positive electrode current collector 13 is filled with a positive electrode active material to form the positive electrode active material filled portion 14. The negative electrode plate 10 includes a negative electrode current collector 15 and a negative electrode active material filled portion 16, and the negative electrode current collector 15 is filled with a negative electrode active material to form the negative electrode active material filled portion 16.

The electrode group 7 has a structure in which a plurality of the positive electrode plates 9 and a plurality of the negative electrode plates 10 are alternately laminated through the separator 11 in a direction that is approximately parallel to an opening surface of the battery jar 2. With regard to the number of the positive electrode plates 9 and the number of the negative electrode plates 10 in the electrode group 7, for example, four negative plates may be set with respect to three positive electrode plates.

In the electrode group 7, ear portions 9a of the plurality of positive electrode plates 9 are collectively welded to each other by a positive electrode side strap 17. Similarly, ear portions 10a of the plurality of negative electrode plates 10 are collectively welded to each other by a negative electrode side strap 18. In addition, the positive electrode side strap 17 and the negative electrode side strap 18 are respectively connected to the positive electrode terminal 4 and the negative electrode terminal 5 through the positive electrode column and the negative electrode column 8.

The separator 11 is formed in a bag shape, and the negative electrode plate 10 is accommodated in the separator

Figure 4:
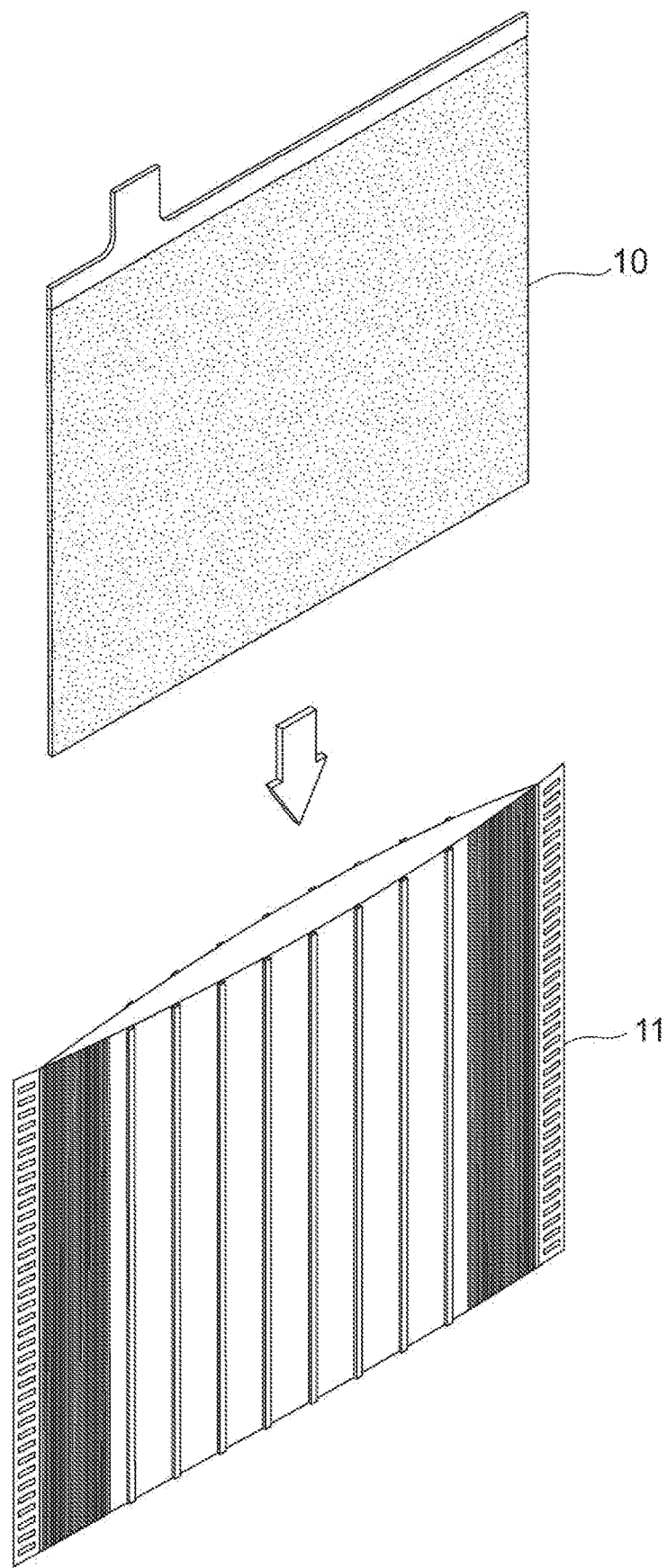
FIG. 4 is a view illustrating an example of a separator for lead acid storage batteries and an electrode.

11. FIG. 4 is a view illustrating the bag-shaped separator 11, and the negative electrode plate 10 that is accommodated in the separator 11.

As the glass fiber, a commercially available glass fiber that is typically used in the separator for lead acid storage batteries can be used. The glass fiber preferably contains alkali glass from the viewpoint of easily obtaining excellent durability and acid resistance. The glass fiber may contain C glass. A glass fiber having C glass composition is excellent in the acid resistance. As the glass fiber, one kind or two or more mixed kinds of fibers may be used for obtaining a glass sheet having a desired pore diameter.

A number-average fiber diameter of the glass fiber is not particularly limited, but is preferably in the following range. From the viewpoint that it tends to easily enlarge a pore diameter of the separator (for example, it tends to easily manufacture a separator having an average pore diameter of 1 μm or more), the number-average fiber diameter is preferably 0.1 μm or more, more preferably 0.3 μm or more, and still more preferably 0.5 μm or more. From the viewpoint that it tends to easily retain an electrolytic solution in the separator, the number-average fiber diameter is preferably 100 μm or less, more preferably 50 μm or less, and still more preferably 20 μm or less. From these viewpoints, the number-average fiber diameter is preferably 0.1 to 100 μm, more preferably 0.3 to 50 μm, and still more preferably 0.5 to 20 μm.

The first layer (a layer with a large average pore diameter) may contain a glass fiber having a number-average fiber diameter larger than that of a glass fiber of the second layer (layer with a small average pore diameter).

The first layer may contain a glass fiber of which a number-average fiber diameter is in the following range. From the viewpoint of easily preventing the penetration short-circuit, the number-average fiber diameter may be 1 μm or more, may be 2 μm or more, may be 3 μm or more, may be 4 μm or more, may be more than 4 μm, may be 5 μm or more, may be 8 μm or more, may be 10 μm or more, and may be 12 μm or more. The number-average fiber diameter may be 20 μm or less, may be 15 μm or less, and may be 12 μm or less. From these viewpoints, the number-average fiber diameter may be 1 to 20 μm.

The second layer may contain a glass fiber of which the number-average fiber diameter is in the following range. The number-average fiber diameter may be 0.5 μm or more, may be 1 μm or more, may be more than 1 μm, may be 2 μm or more, may be 3 μm or more, may be 4 μm or more, may be more than 4 μm, and may be 5 μm or more. From the viewpoint of easily preventing the penetration short-circuit, the number-average fiber diameter may be 10 μm or less, may be 8 μm or less, may be 6 μm or less, and may be 5.5 μm or less. From these viewpoints, the number-average fiber diameter may be 0.5 to 10 μm.

Although not particularly limited, a number-average fiber length of the glass fiber is preferably in the following range. From the viewpoint that it tends to be easily adjusted to a uniform pore diameter, the number-average fiber length is preferably 1 μm or more, more preferably 100 μm or more, and still more preferably 500 μm or more. From the viewpoint that it tends to easily manufacture a separator having sufficiently high strength (for example, 1 MPa or more), and from the viewpoint that it tends to easily obtain a satisfactory sheet-making property at the time of sheet-making described later, the number-average fiber length is preferably 30 mm or less, more preferably 20 mm or less, and still more preferably 10 mm or less. From these viewpoints, the number-average fiber length is preferably 1 μm to 30 mm, more preferably 100 μm to 20 mm, and still more preferably 500 μm to 10 mm.

In the embodiment, the number-average fiber diameter and the number-average fiber length of the glass fiber can be obtained by a dynamic image analysis method, a laser scanning method (for example, on the basis of JIS L 1081 (Testing methods for wool fibres and hairs)), direct observation by a scanning electron microscope (SEM) or the like, and the like. Specifically, the above-described number-average fiber diameter and the above-described number-average fiber length can be obtained by observing at least approximately 200 pieces of glass fibers using these methods, and by taking an average value thereof.

As the organic binder, a binder having excellent acid resistance and water resistance is preferable, and examples thereof include an olefin resin, an acrylic resin, a urethane resin, and a styrene resin. As the organic binder, from the viewpoint of easily improving affinity between the separator and the electrolytic solution, a thermoplastic resin having a hydrophilic group such as a sulfo group and a carboxyl group may be used. The organic binder preferably includes at least one kind selected from the group consisting of an olefin resin and a styrene resin from the viewpoint that excellent mechanical strength and retention property of the electrolytic solution are easily compatible. From the viewpoint of easily obtaining excellent acid resistance and water resistance, and the viewpoint of easily obtaining excellent affinity of the separator with respect to a sulfuric acid, the organic binder preferably includes at least one kind selected from the group consisting of polypropylene and polyethylene, and more preferably polypropylene. As the organic binder, one kind may be used alone or two or more kinds may be used in combination.

The content of the organic binder contained in the separator is preferably in the following range with respect to the total mass (total mass in the separator) of the glass fiber. The content of the organic binder contained in the first layer is preferably in the following range with respect to the total mass (total mass in the first layer) of the glass fiber. The content of the organic binder contained in the second layer is preferably in the following range with respect to the total mass (total mass in the second layer) of the glass fiber. From the viewpoint that the strength of the separator is likely to be maintained and thus the separator is less likely to be ruptured, the content of the organic binder is preferably 0.5% by mass or more, more preferably 1% by mass or more, still more preferably 2% by mass or more, especially more preferably 3% by mass or more, extremely more preferably 5% by mass or more, and highly more preferably 7% by mass or more. From the viewpoint of easily retaining the electrolytic solution in the separator, the content of the organic binder is preferably 20% by mass or less, more preferably 15% by mass or less, and still more preferably 10% by mass or less. From these viewpoints, the content of the organic binder is preferably 0.5 to 20% by mass, more preferably 1 to 15% by mass, and still more preferably 2 to 10% by mass.

The content of the organic binder contained in the separator is preferably in the following range with respect to the total amount (total amount in the separator) of the glass fiber and the organic binder. The content of the organic binder contained in the first layer is preferably in the following range with respect to the total amount (total amount in the first layer) of the glass fiber and the organic binder. The content of the organic binder contained in the second layer is preferably in the following range with respect to the total amount (total amount in the second layer) of the glass fiber and the organic binder. From the viewpoint of easily retaining a shape of the separator, the content of the organic binder is preferably 1% by mass or more, more preferably 3% by mass or more, still more preferably 5% by mass or more, especially more preferably 7% by mass or more, and extremely more preferably 8% by mass or more. From the viewpoint of easily retaining the electrolytic solution, the content of the organic binder is preferably 20% by mass or less, more preferably 15% by mass or less, and still more preferably 10% by mass or less. From these viewpoints, the content of the organic binder is preferably 1 to 20% by mass.

In two layers disposed on an outer side in the separator of the embodiment, an average pore diameter $D1$ of the first layer is preferably in the following range. From the viewpoint that the electrolytic solution is likely to diffuse, the average pore diameter $D1$ is preferably 10 μm or more, more preferably 15 μm or more, still more preferably 20 μm or more, especially more preferably 30 μm or more, extremely more preferably 40 μm or more, highly more preferably 50 μm or more, further more preferably 70 μm or more, still more preferably 90 μm or more, and especially more preferably 100 μm or more. From the viewpoint of easily retaining the electrolytic solution, the average pore diameter $D1$ is preferably 500 μm or less, more preferably 400 μm or less, still more preferably 300 μm or less, especially more preferably 200 μm or less, extremely more preferably 150 μm or less, and highly more preferably 120 μm or less. From these viewpoints, the average pore diameter $D1$ is preferably 10 to 500 μm, more preferably 15 to 400 μm, and still more preferably 20 to 300 μm. The average pore diameter $D1$ may be 10 to 20 μm.

In the two layers disposed on an outer side in the separator of the embodiment, an average pore diameter $D2$ of the second layer is preferably in the following range. From the viewpoint of easily retaining the electrolytic solution in the separator, the average pore diameter $D2$ is preferably 1 μm or more, more preferably 2 μm or more, still more preferably 3 μm or more, especially more preferably 3.5 μm or more, extremely more preferably more than 3.5 μm, and highly more preferably 4 μm or more. From the viewpoint of slowing diffusion of the electrolytic solution, the average pore diameter $D2$ is preferably 9 μm or less, more preferably 8 μm or less, still more preferably 7 μm or less, especially more preferably 6 μm or less, and extremely more preferably 5 μm or less. From these viewpoints, the average pore diameter $D2$ is preferably 1 to 9 μm, more preferably 2 to 8 μm, and still more preferably 3 to 7 μm.

In the separator of the embodiment, from the viewpoint of easily preventing the penetration short-circuit, the average pore diameter $D2$ of one of layers disposed on an outer side of the separator is preferably 1 to 9 μm, and the average pore diameter $D1$ of the other layer is preferably 10 to 500 μm. The average pore diameter of each of the layers may be enlarged using a glass fiber having a large number-average fiber diameter.

From the viewpoint of preventing the penetration short-circuit, a ratio $D1/D2$ of the average pore diameter $D1$ of the first layer with respect to the average pore diameter $D2$ of the second layer is more than 1, and the following range is preferable. From the viewpoint of easily preventing the penetration short-circuit, the ratio $D1/D2$ is preferably 2 or more, more preferably 4 or more, still more preferably 5 or more, especially more preferably 7 or more, extremely more preferably 10 or more, highly more preferably 13 or more, further more preferably 15 or more, still more preferably 18 or more, especially more preferably 20 or more, and extremely more preferably 23 or more. From the viewpoint of easily preventing the penetration short-circuit, the ratio $D1/D2$ is preferably 50 or less, more preferably 30 or less, and still more preferably 25 or less. From these viewpoints, the ratio $D1/D2$ is preferably more than 1 and 50 or less.

The overall thickness (film thickness) T of the separator of the embodiment is preferably in the following range. From the viewpoint of easily manufacturing a separator of two or more layers in a typical sheet-making method, and from the viewpoint of easily retaining a necessary amount of electrolytic solution, the overall thickness T of the separator is preferably 0.1 mm or more, more preferably 0.3 mm or more, still more preferably 0.4 mm or more, and especially more preferably 0.5 mm or more. From the viewpoint of increasing the number of electrodes (electrode plates or the like) which are used to easily increase the capacity of the lead acid storage battery, the overall thickness T of the separator is preferably 1.2 mm or less, more preferably 1.0 mm or less, still more preferably 0.8 mm or less, especially more preferably 0.7 mm or less, extremely more preferably 0.65 mm or less, and highly more preferably 0.6 mm or less. From these viewpoints, the overall thickness T of the separator is preferably 0.1 to 1.2 mm, more preferably 0.3 to 1.0 mm, and still more preferably 0.5 to 0.8 mm. The overall thickness T of the separator may be more than 1.2 mm.

From the viewpoint of preventing the penetration short-circuit, the thickness $T1$ of the first layer is equal to or less than the half of the overall thickness T of the separator. That is, a ratio $T1/T$ of the thickness $T1$ of the first layer with respect to the overall thickness T of the separator is 0.5 or less. From the viewpoint of easily preventing the penetration short-circuit, the ratio $T1/T$ is preferably 0.48 or less, more preferably 0.47 or less, still more preferably 0.4 or less, especially more preferably ⅓ or less, extremely more preferably 0.3 or less, and highly more preferably ¼ or less. From the viewpoint of easily preventing the penetration short-circuit, the ratio $T1/T$ is preferably 0.1 or more, more preferably 0.2 or more, and still more preferably 0.24 or more. From these viewpoints, the ratio $T1/T$ is preferably 0.1 to 0.5.

The thickness $T1$ of the first layer is preferably in the following range. From the viewpoint of easily preventing the penetration short-circuit, the thickness $T1$ is preferably 0.01 mm or more, more preferably 0.05 mm or more, still more preferably 0.1 mm or more, especially more preferably 0.12 mm or more, and extremely more preferably 0.14 mm or more. From the viewpoint of easily preventing the penetration short-circuit, the thickness $T1$ is preferably 1 mm or less, more preferably 0.8 mm or less, still more preferably 0.6 mm or less, especially more preferably 0.4 mm or less, extremely more preferably 0.3 mm or less, highly more preferably 0.28 mm or less, further more preferably 0.25 mm or less, still more preferably 0.2 mm or less, and especially more preferably 0.18 mm or less. From these viewpoints, the thickness $T1$ is preferably 0.01 to 1 mm, and more preferably 0.14 to 0.3 mm.

A ratio $T2/T$ of the thickness $T2$ of the second layer with respect to the overall thickness T of the separator is preferably in the following range. From the viewpoint of easily preventing the penetration short-circuit, the ratio $T2/T$ is preferably 0.5 or more, more preferably 0.52 or more, still more preferably 0.53 or more, especially more preferably 0.6 or more, extremely more preferably ⅔ or more, highly more preferably 0.7 or more, and further more preferably ¾ or more. From the viewpoint of easily preventing the penetration short-circuit, the ratio $T2/T$ is preferably 0.9 or less, more preferably 0.8 or less, and still more preferably 0.76 or less. From these viewpoints, the ratio T2/T is preferably 0.5 to 0.9.

The thickness T2 of the second layer is preferably in the following range. From the viewpoint of easily preventing the penetration short-circuit, the thickness T2 is preferably 0.01 mm or more, more preferably 0.05 mm or more, still more preferably 0.1 mm or more, especially more preferably 0.2 mm or more, extremely more preferably 0.3 mm or more, and highly more preferably 0.4 mm or more. From the viewpoint of easily preventing the penetration short-circuit, the thickness T2 is preferably 1 mm or less, more preferably 0.8 mm or less, still more preferably 0.6 mm or less, especially more preferably 0.5 mm or less, and extremely more preferably 0.45 mm or less. From these viewpoints, the thickness T2 is preferably 0.01 to 1 mm, and more preferably 0.3 to 0.45 mm.

A ratio T1/T2 of the thickness T1 of the first layer with respect to the thickness T2 of the second layer is preferably in the following range. From the viewpoint of easily preventing the penetration short-circuit, the ratio T1/T2 is preferably 0.1 or more, more preferably 0.2 or more, and still more preferably 0.3 or more. From the viewpoint of easily preventing the penetration short-circuit, the ratio T1/T2 is preferably 1 or less, more preferably less than 1, still more preferably 0.98 or less, especially more preferably 0.96 or less, extremely more preferably 0.95 or less, highly more preferably 0.94 or less, further more preferably 0.92 or less, still more preferably 0.9 or less, especially more preferably 0.7 or less, extremely more preferably 0.5 or less, highly more preferably 0.4 or less, and further more preferably 0.35 or less. From these viewpoints, the ratio T1/T2 is preferably 0.1 to 1.

From the viewpoint of easily preventing the penetration short-circuit, the separator of the embodiment may have an aspect that the overall thickness of the separator is 0.1 to 1.2 mm, and the thickness of a layer, which is disposed on an outer side and has an average pore diameter of 10 to 20 μm, is equal to or less than the half of the overall thickness of the separator.

The separator of the embodiment may have an aspect that the separator has a layer structure of two or more layers including a first layer in which an average pore diameter is 10 μm or more and a second layer in which an average pore diameter is 9 μm or less, and the overall thickness (film thickness) is 1.2 mm or less, and a thickness of the first layer is equal to or less than the half of the overall thickness of the separator. In this case, by disposing the first layer on a positive electrode side and disposing the second layer on the negative electrode side, it is easy to suppress occurrence of the penetration short-circuit of the lead acid storage battery at the time of battery jar formation.

A separator manufacturing method of the embodiment is a method for manufacturing a separator for lead acid storage batteries which is to be disposed between a positive electrode and a negative electrode in a lead acid storage battery including the positive electrode and the negative electrode. According to the separator manufacturing method of the embodiment, it is possible to obtain the separator of the embodiment.

The separator manufacturing method of the embodiment includes a separator manufacturing step of manufacturing a separator including a first layer that is in contact with the positive electrode and a second layer that is in contact with the negative electrode. For example, the separator manufacturing step may include a first layer manufacturing step of obtaining the above-described first layer and a second layer manufacturing step of obtaining the above-described second layer. The first layer manufacturing step (or the second layer manufacturing step) may be sheet-making for obtaining the first layer (or the second layer) by performing sheet-making using slurry containing a glass fiber and an organic binder. In this case, the glass fiber may have the number-average fiber diameter in the above-described preferred range. It is possible to adjust a pore diameter of the first layer and/or the second layer by adjusting a fiber diameter of the glass fiber which is used in the first layer manufacturing step and/or the second layer manufacturing step. It is possible to adjust the thickness of the first layer and/or the second layer by adjusting the amount of the glass fiber and the organic binder which are used in the first layer manufacturing step and/or the second layer manufacturing step. The separator manufacturing step may include a lamination step of laminating the first layer and the second layer to obtain a stacked object including the first layer and the second layer.

The separator manufacturing method (the above-described first layer and second layer manufacturing method) of the embodiment is not particularly limited, and examples thereof include wet-type sheet-making, dry-type sheet-making, and the like. Among these, it is preferable to employ a sheet-making based on the wet-type method (wet-type sheet-making). This manufacturing method includes a slurry preparing step of preparing slurry containing a glass fiber, an organic binder, and the like, a sheet-formed body manufacturing step of making the slurry into a sheet to manufacture a sheet-formed body, a compressed body manufacturing step of compressing the sheet-formed body in a thickness direction using a pressurizer to manufacture a compressed body, and a heat treatment step of heat-treating the compressed body at a temperature equal to or higher than a softening point of a resin (organic binder) as necessary. According to this method, it is possible to easily manufacture a non-expensive and thin separator for lead acid storage batteries. Here, the sheet-formed body obtained by making the slurry into a sheet is a sheet-shaped or mat-shaped molded body obtained by bonding glass fibers with an organic binder, and may be hereinafter referred as "glass sheet". In addition, the compressed body is obtained by compressing this glass sheet in a thickness direction. The glass sheet used when manufacturing the compressed body may be one sheet, or a body obtained by superimposing a plurality of the sheets on each other in a thickness direction.

In the slurry preparing step, the glass fiber and the organic binder are dispersed in a predetermined dispersion medium. The slurry preparation may be performed, for example, by a mixer, a ball mill, a pulper, or the like. As the dispersion medium, water can be used. For example, the content of each raw material component in the slurry may be adjusted so that the content of each raw material component in an obtained separator for lead acid storage batteries is in the above-described range.

The slurry may contain a surfactant. When the slurry contains the surfactant, it is easy to disperse raw material components when manufacturing the separator for lead acid storage batteries. The surfactant may be decomposed in the subsequent heat treatment. The surfactant may be any one of a silane coupling agent, a cationic surfactant, an anionic surfactant, a nonionic surfactant, and the like. The content of the surfactant is preferably 0.01 to 5% by mass on the basis of the total mass of the slurry.

As the cationic surfactant, an alkyl ammonium salt is preferably used. Examples of the cationic surfactant include dioctyl dimethyl ammonium chloride, didecyl dimethyl ammonium chloride, dicocodimethyl ammonium chloride, coco (rectification) benzyl dimethyl ammonium chloride, octadecyl trimethyl ammonium chloride, dioctadecyl dimethyl ammonium chloride, dihexadecyl dimethyl ammonium chloride, di(hydrogenated tallow) dimethyl ammonium chloride, di(hydrogenated tallow) benzyl methyl ammonium chloride, (hydrogenated tallow) benzyl dimethyl ammonium chloride, dioleyl dimethyl ammonium chloride, di(ethylene hexadecane carboxylate) dimethyl ammonium chloride, diallyl dimethyl ammonium chloride, N-octadecyl-N-dimethyl-N'-trimethyl-propylene-diammonium dichloride, poly(dioctyl dimethyl ammonium chloride), poly(didecyl dimethyl ammonium chloride), poly(dicocodimethyl ammonium chloride), poly(cocobenzyl dimethyl ammonium chloride), poly(octadecyl trimethyl ammonium chloride), poly(dioctadecyl dimethyl ammonium chloride), poly(dihexadecyl dimethyl ammonium chloride), poly(dioleyl dimethyl ammonium chloride), poly(di(ethylene hexadecane carboxylate) dimethyl ammonium chloride), and poly(diallyl dimethyl ammonium chloride).

Examples of the anionic surfactant include carboxylates, N-acyl sarcosinates, alkane sulfonates, linear and branched chain alkyl aryl sulfonates, dialkyl sulfosuccinates, aryl sulfonates, naphthalene sulfonates, N-acyl-N-alkyl laurates, 2-sulfoethyl esters of fatty acids, olefin sulfonates, alkyl sulphates, sulphated natural oils, sulphated alkyl phenol alkoxylates, alkanols, phosphate esters of phenol and alkyl phenol alkoxylates, alkyl(aryl) sulfonates, sulfate esters, phosphate esters, alkyl(aryl) phosphates, alkyl(aryl) phosphonates, polyoxyethylene alkyl ether phosphates, carboxylated alkyl ethoxylates, carboxylated dodecylbenzene sulfonates, and ammonium polyoxyethylene alkyl ether sulphates.

Examples of the nonionic surfactant include polyoxyalkylene dialkyl esters, polyoxyalkylene alkyl esters, polyoxyalkylene alkyl ethers, and sorbitan alkyl esters.

The slurry may contain a coagulant. When the slurry contain the coagulant, it is possible to improve a yield rate of the separator that is manufactured. The coagulant may be any one of an inorganic coagulant (aluminum sulfate, polyaluminum chloride, polyferric sulfate, ferric chloride, or the like), a cationic polymer coagulant, an anionic polymer coagulant, and the like. The coagulant may be used alone, or two or more kinds may be used in combination. The content of the coagulant is preferably 0.01 to 10% by mass on the basis of the total amount of a solid content of the slurry. The content of the coagulant is preferably 1 to 10% by mass, more preferably 2 to 8% by mass, and still more preferably 3 to 6% by mass with respect to the total mass of the glass fiber.

For example, after manufacturing a sheet-formed body (glass sheet) by making the slurry into a sheet using a typical sheet-making device in a sheet-formed body manufacturing step, the sheet-formed body is compressed in a thickness direction using a pressurizer to manufacture a compressed body (separator for lead acid storage batteries) in the compressed body manufacturing step. To obtain a desired compressed body, it is preferable to compress the sheet-formed body at 1 to 30 MPa for 1 to 5 minutes. As the sheet-formed body (glass sheet) that is used when manufacturing the compressed body, one sheet may be used alone, or a plurality of the sheets may be used after being superimposed on each other in a thickness direction.

The heat treatment step is a step that is not necessarily performed, and may be performed as necessary in conformity to a material configuration of the separator. In the heat treatment step, by heat-treating the compressed body at a temperature equal to or higher than a softening point of a resin (organic binder), it is possible to soften the organic binder to reliably bound glass fibers to each other. A treatment temperature depends on the softening point of the resin (organic binder) and is thus not necessarily limited, but the treatment temperature is preferably 100° C. to 200° C. When the treatment temperature is 100° C. or higher, there is a tendency that glass fibers are easily bounded to each other. When the treatment temperature is 200° C. or lower, it is easy to simplify a manufacturing step. The heat treatment step may be performed while appropriately performing compression in correspondence with a constituent material of the separator for lead acid storage batteries.

The positive electrode active material may include $\beta$-$PbO_2$ as a Pb component. The positive electrode active material may include $\alpha$-$PbO_2$ and may not include the $\alpha$-$PbO_2$. The positive electrode active material may include a Pb component (for example, $PbSO_4$) other than $PbO_2$, and an additive described later as necessary.

The positive electrode active material can be obtained by forming an unformed positive electrode active material after aging and drying a paste-like positive electrode active material (positive electrode active material paste) containing a raw material of the positive electrode active material to obtain the unformed positive electrode active material. The positive electrode can be obtained by forming an unformed positive electrode active material after aging and drying a paste-like positive electrode active material filled in a positive electrode current collector (casted lattice body, an expanded lattice body, or the like) to obtain the unformed positive electrode active material. The unformed positive electrode active material may include tribasic lead sulfate as a main component. Examples of a raw material of the positive electrode active material include a lead powder and red lead ($Pb_3O_4$).

The positive electrode current collector serves as a conductive path of a current from the positive electrode active material, and retains the positive electrode active material. For example, the positive electrode current collector has a lattice shape. Examples of a composition of the positive electrode current collector include lead alloys such as a lead-calcium-tin based alloy and a lead-antimony-arsenic based alloy. Selenium, silver, bismuth, or the like may be appropriately added to the positive electrode current collector in correspondence with application. The positive electrode current collector can be obtained by forming these lead alloys in a lattice shape by a gravity casting method, an expanding method, a punching method, or the like.

Examples of an additive that can be contained in the positive electrode active material include a carbon material (excluding a carbon fiber) and a reinforcing short fiber. Examples of the carbon material include carbon black and graphite. Examples of the carbon black include furnace black, channel black, acetylene black, thermal black, and Ketjen black. Examples of the reinforcing short fiber include an acrylic fiber, a polyethylene fiber, a polypropylene fiber, a polyethylene terephthalate fiber, and a carbon fiber.

The negative electrode active material may include Pb as a Pb component. The negative electrode active material may include a Pb component (for example, $PbSO_4$) other than Pb, and an additive described later as necessary. The negative electrode active material may include porous spongy lead.

The negative electrode active material can be obtained by forming an unformed negative electrode active material after aging and drying a paste-like negative electrode active material (negative electrode active material paste) containing a raw material of the negative electrode active material to obtain the unformed negative electrode active material.

The negative electrode can be obtained by forming an unformed negative electrode active material after aging and drying a paste-like negative electrode active material filled in a negative electrode current collector (casted lattice body, an expanded lattice body, or the like) to obtain the unformed negative electrode active material. The unformed negative electrode active material may include tribasic lead sulfate as a main component. Examples of a raw material of the negative electrode active material include a lead powder.

The negative electrode current collector serves as a conductive path of a current from the negative electrode active material, and retains the negative electrode active material. The negative electrode current collector may be the same as or different from the above-described positive electrode current collector.

Examples of the additive that can be contained in the negative electrode active material include a resin having a sulfo group and/or a sulfonate group, barium sulfate, a carbon material (excluding a carbon fiber), and a reinforcing short fiber. Examples of the resin having the sulfo group and/or the sulfonate group include ligninsulfonic acid, a ligninsulfonic acid salt, and a condensate of phenols, aminoaryl sulfonic acid, and formaldehyde (for example, a condensate of bisphenol, aminobenzene sulfonic acid, and formaldehyde). Examples of the carbon material include carbon black and graphite. Examples of carbon black include furnace black, channel black, acetylene black, thermal black, and Ketjen black. Examples of the reinforcing short fiber include an acrylic fiber, a polyethylene fiber, a polypropylene fiber, a polyethylene terephthalate fiber, and a carbon fiber.

The paste-like positive electrode active material and/or the paste-like negative electrode active material may contain a solvent and/or sulfuric acid. Examples of the solvent include water (for example, ion-exchanged water) and an organic solvent.

A method for manufacturing the lead acid storage battery of the embodiment includes, for example, a battery manufacturing step of obtaining a lead acid storage battery by assembling constituent members including the electrodes and the separator. In the battery manufacturing step, for example, after unformed negative electrodes and unformed positive electrodes are alternately laminated through the separator for lead acid storage batteries of the embodiment, same-polarity electrodes (electrode plates or the like) are connected (welded or the like) to each other by a strap to obtain an electrode group (electrode plate group or the like). This electrode group is disposed in a battery jar to manufacture an unformed battery. Next, dilute sulfuric acid is injected into the unformed battery, and then forming is performed by applying a direct current to obtain the lead acid storage battery. In addition, after the dilute sulfuric acid is removed at once, the electrolytic solution may be injected.

EXAMPLES

Hereinafter, the invention will be described in more detail with reference to examples and comparative examples, but the invention is not limited to the following examples.

Examples 1

(Number-Average Fiber Diameter Measurement)

Figure 5:
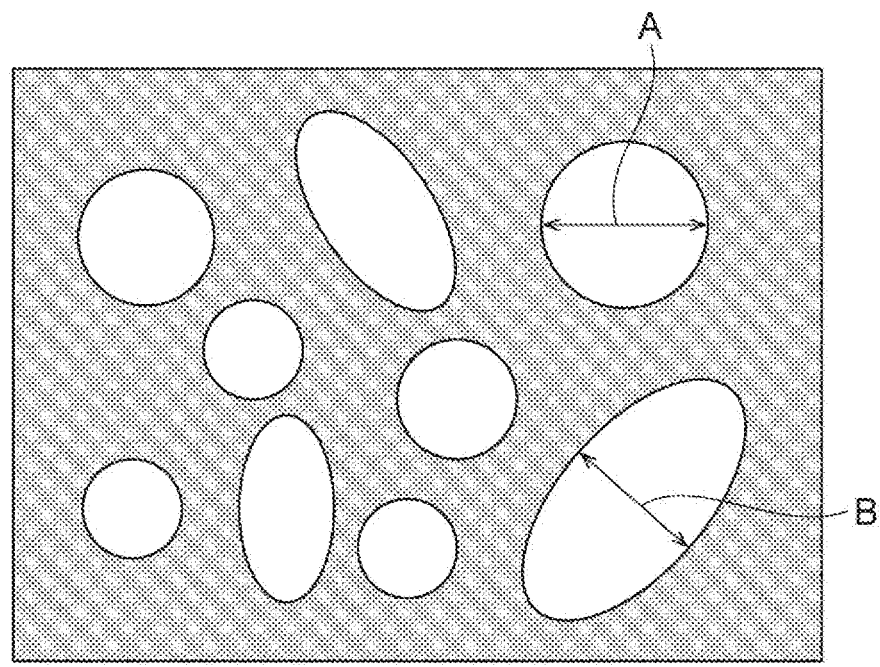
FIG. 5 is a schematic view of an electron microscopic photograph for describing a method for measuring a number-average fiber diameter of a glass fiber.

A number-average fiber diameter of the glass fiber described later was measured in advance in the following procedure. After the glass fiber was cast with an epoxy resin, and slicing was performed with a diamond cutter to achieve a thickness of 4 mm. After the slicing, a cross-sectional portion of the glass fiber (a cross-sectional portion perpendicular to a length direction of the glass fiber) was polished with diamond abrasive grains having a diameter of 9 µm. In addition, after polishing with diamond abrasive grains having a diameter of 5 µm, polishing was performed with diamond abrasive grains having a diameter of 1 µm to prepare a measurement sample. Platinum was vapor-deposited on the measurement sample with ion sputtering (product name: E-1030, manufactured by Hitachi High-Tech Corporation), and a cross-section of the glass fiber was observed with a SEM (product name: S-8020, manufactured by Hitachi High-Tech Corporation). A fiber diameter of a total of 200 pieces of glass fibers was measured, and an average value thereof was obtained as the number-average fiber diameter. At this time, in a case where the cross-section of the glass fiber was a perfect circle, a diameter of the perfect circle was acquired as the fiber diameter, and in a case where the cross-section of the glass fiber was an elliptical shape, a minor axis was acquired as the fiber diameter (refer to FIG. 5, reference numerals A and B represent the fiber diameter). A cross-section parallel to the length direction of the glass fiber was excluded from fiber diameter measurement.

(Manufacturing of Separator)

After water was added to 210 g of glass fiber A (water content rate: 5% by mass, product name: C-08-R, manufactured by Lauscha Fiber International) having a number-average fiber diameter of 0.8 µm for adjustment to 20 kg, 20 g of surfactant (dispersing agent, product name: PASCOL HA-52, manufactured by Meisei Chemical Works, Ltd. "PASCOL" is a registered trademark) was added to obtain a mixed solution A. This mixed solution A was put into a pulper for 20 L (manufactured by KUMAGAI RIM KOGYO Co., Ltd.), and then the mixed solution A was stirred for 10 minutes. With regard to a glass fiber B having a number-average fiber diameter of 5.1 µm, a mixed solution (mixed solution B) was prepared in the same procedure, and was stirred. After stirring, 4.5 kg was taken from the mixed solution A containing the glass fiber A having the number-average fiber diameter of 0.8 µm, and 0.5 kg was taken from the mixed solution B containing the glass fiber B having the number-average fiber diameter of 5.1 µm, and then these mixed solution A and mixed solution B were mixed to obtain a mixed solution C. That is, on the basis of the total mass of the glass fiber, the mixed solution C contains 90% by mass of glass fiber having the number-average fiber diameter of 0.8 µm, and 10% by mass of glass fiber having the number-average fiber diameter of 5.1 µm.

4% by mass of aluminum sulfate (coagulant, manufactured by Nippon Light Metal Company, Ltd.) with respect to the total mass of the glass fiber was added to the mixed solution C, and then stirring was performed by a stirrer for 10 minutes. Then, a polypropylene emulsion (product name: TC-4010, manufactured by UNITIKA LTD., a water dispersion obtained by amine-neutralizing a propylene-acrylic acid copolymer) as an organic binder was added to the mixed solution C so that a resin content becomes 9% by mass with respect to the total mass of the glass fiber, and then stirring was performed for two minutes to prepare slurry A.

Similarly, with regard to the case of using only a glass fiber C having the number-average fiber diameter of 2.4 µm, slurry B was prepared in the same procedure.

180 g of slurry A was poured into a ϕ160 mm round sheet machine (manufactured by KUMAGAI RIM KOGYO Co., Ltd.) provided with a 80-mesh wire net while injecting water. Water was injected until a water amount inside the sheet machine becomes approximately 80% (7 L), and then siring was performed several times with a stirring rod. Then, water was taken out, and sheet-making was performed to obtain a glass sheet A. With regard to 75 g of slurry B, sheet-making was performed in a similar manner to obtain a glass sheet B.

After the glass sheet A was covered with first filter paper (26-WA, manufactured by ADVANTEC CO., LTD.) and dehydration was performed sufficiently with a couching roll, the glass sheet A was taken out from the above-described 80-mesh wire net in combination with the first filter paper. After the glass sheet A and the glass sheet B were brought into contact with each other, the first filter paper was covered with second filter paper (26-WA, manufactured by ADVANTEC CO., LTD.) and dehydration was performed sufficiently with a couching roll. Then, the first filter paper and the second filter paper were peeled off to obtain a glass sheet having a two-layer configuration composed of the glass sheet A and the glass sheet B.

This glass sheet was pressed with a press machine (manufactured by KUMAGAI RIM KOGYO Co., Ltd.) under 410 KPa for five minutes and was dehydrated. After dehydration, heat drying was performed with a rotary dryer (manufactured by KUMAGAI RIM KOGYO Co., Ltd.) at 120° C. for four minutes, and drying was sufficiently performed in a constant temperature bath at 105° C. to obtain a separator for lead acid storage batteries.

(Thickness Measurement)

A thickness was measured at six points under a pressure of 20 kgf/cm$^2$ (1.96 MPa) using a shopper type thickness measuring device (manufactured by YASUDA SEIKI SEISAKUSHO, LTD.), and an average value thereof was obtained as the thickness of the separator for lead acid storage batteries. With regard to the thickness of each layer of the two-layer separator, a separator was manufactured using only each layer, and the thickness thereof was obtained as the thickness of each layer.

(Pore Diameter Analysis)

0.05 g of separator was added to a small cell (diameter: 10 mm×30 mm) and an average pore diameter of the separator was measured using a fully automatic pore distribution measuring device (Poro Master 60-GT, manufactured by Quanta Chrome Co.). With regard to mercury parameters, a mercury contact angle was set to 140 degrees, and a mercury surface tension was set to 480 dyn/cm. A pore diameter measurement range was set to a range of 0.0036 to 1000 μm, and each value was calculated to obtain a median pore diameter as the average pore diameter of the separator. It was confirmed that the above-described glass sheet A provides an average pore diameter smaller than an average pore diameter of the above-described glass sheet B. With regard to a pore diameter of each layer of the two-layer separator, a separator was manufactured using only each layer, and a pore diameter thereof was obtained as the pore diameter of each layer.

(Manufacturing of Electrode Plate)

As a raw material of the positive electrode active material, a lead powder and red lead ($Pb_3O_4$) were used (lead powder: red lead=96:4 (mass ratio)). The raw material of the positive electrode active material, 0.07% by mass of reinforcing short fiber (acrylic fiber) on the basis of the total mass of the raw material of the positive electrode active material, and water were mixed and kneaded. Continuously, kneading was performed while adding dilute sulfuric acid (specific gravity: 1.280) little by little to prepare a paste-like positive electrode active material.

As a raw material of the negative electrode active material, a lead powder was used. A mixture containing 0.2% by mass (in terms of a solid content) of lignin-based resin (lignin sulfonate), 0.1% by mass of reinforcing short fiber (acrylic fiber), 1.0% by mass of barium sulfate, and 0.2% by mass of carbon material (furnace black) was added to the lead powder, and then dry-mixing was performed (the blending amount is a blending amount on the basis of the total mass of the raw material of the negative electrode active material). Next, after adding water, kneading was performed. Continuously, kneading was performed while adding dilute sulfuric acid (specific gravity: 1.280) little by little to prepare a paste-like negative electrode active material.

An electrode plate (positive electrode current collector) was filled with the paste-like positive electrode active material and an electrode plate (negative electrode current collector) was filled with the paste-like negative electrode active material so that a ratio (N/P) between the total mass (N) of the negative electrode active material and the total mass (P) of the positive electrode active material in a control valve type lead acid storage battery in a fully charged state becomes 0.7. As the electrode plates, a casted lattice body formed from a lead alloy was used.

An unformed positive electrode plate was manufactured using an electrode plate filled with a paste-like positive electrode active material through an aging step under the following Aging Conditions 1 to 3, and a drying step under the following Drying condition.

Aging Condition 1 "temperature: 80° C., humidity: 98%, time: 10 hours"

Aging Condition 2 "temperature: 65° C., humidity: 75%, time: 13 hours"

Aging Condition 3 "temperature: 40° C., humidity: 65%, time: 40 hours"

Drying condition "temperature: 60° C., time: 24 hours"

An unformed negative electrode plate was manufactured using an electrode plate filled with a paste-like negative electrode active material through an aging step under an aging condition of "temperature: 40° C., humidity: 98%, time: 40 hours", and a drying step under a drying condition of "temperature: 60° C., time: 24 hours".

(Manufacturing of Lead Acid Storage Battery)

In a state in which a surface with a small average pore diameter in the separator was brought into contact with the unformed negative electrode plate, and a surface with a large average pore diameter in the separator was brought into contact with the unformed positive electrode plate, three sheets of the unformed positive electrode plates and four sheets of the unformed negative electrode plates were alternately laminated through the above-described separator to manufacture an electrode plate group. After the electrode plate group was inserted into a battery jar, a positive electrode terminal and a negative electrode terminal were welded to the electrode plate group, and then the battery jar was hermetically sealed. Next, an electrolytic solution containing dilute sulfuric acid having specific gravity of 1.28 as a main component was injected into the battery jar through an exhaust plug port, and then a control valve was mounted, thereby manufacturing a total of three lead acid storage batteries.

(Penetration Short-Circuit Evaluation)

As penetration short-circuit evaluation, the above-described three lead acid storage batteries were subjected to battery jar formation in a water bath under conditions of "water temperature: 25° C., the amount of electricity: 250% with respect to a theoretical amount of electricity of the positive electrode active material at the time of formation, time: 60 hours", and a case where an open voltage after battery jar formation is 2 V or more was determined as "without penetration short-circuit". A case where all of the three lead acid storage batteries are not penetration short-circuited was evaluated as "A", a case where one or two lead acid storage batteries are penetration short-circuited was evaluated as "B", and a case where all of the lead acid storage batteries are penetration short-circuited was evaluated as Example 2

A separator for lead acid storage batteries and a lead acid storage battery were manufactured and the penetration short-circuit evaluation was performed in a similar manner as in Example 1 except that slurry (slurry C) obtained by changing the glass fiber having a number-average fiber diameter of 2.4 μm was changed to a glass fiber having a number-average fiber diameter of 4.1 μm was used. In a single-layer separator manufactured with the slurry C, the thickness was 0.14 mm, and an average pore diameter was 26 μm.

Example 3

A separator for lead acid storage batteries and a lead acid storage battery were manufactured and the penetration short-circuit evaluation was performed in a similar manner as in Example 1 except that slurry (slurry D) obtained by changing the glass fiber having a number-average fiber diameter of 2.4 μm was changed to a glass fiber having a number-average fiber diameter of 5.1 μm was used. In a single-layer separator manufactured with the slurry D, the thickness was 0.15 mm, and an average pore diameter was 58 μm.

Example 4

A separator for lead acid storage batteries and a lead acid storage battery were manufactured and the penetration short-circuit evaluation was performed in a similar manner as in Example 1 except that slurry (slurry E) obtained by changing the glass fiber having a number-average fiber diameter of 2.4 μm was changed to a glass fiber having a number-average fiber diameter of 12 μm was used. In a single-layer separator manufactured with the slurry E, the thickness was 0.16 mm, and an average pore diameter was 105 μm.

Example 5

A separator and a lead acid storage battery were manufactured and the penetration short-circuit evaluation was performed in a similar manner as in Example 1 except that the amount of the slurry A used was changed to 125 g, and the amount of the slurry B used was changed to 125 g.

Example 6

A separator and a lead acid storage battery were manufactured and the penetration short-circuit evaluation was performed in a similar manner as in Example 5 except that the slurry B was changed to the slurry C.

Example 7

A separator and a lead acid storage battery were manufactured and the penetration short-circuit evaluation was performed in a similar manner as in Example 5 except that the slurry B was changed to the slurry D.

Example 8

A separator and a lead acid storage battery were manufactured and the penetration short-circuit evaluation was performed in a similar manner as in Example 5 except that the slurry B was changed to the slurry E.

Comparative Example 1

A separator and a lead acid storage battery were manufactured and the penetration short-circuit evaluation was performed in a similar manner as in Example 1 except that the amount of the slurry A used was changed to 70 g, and the amount of the slurry B used was changed to 180 g.

Comparative Example 2

A separator and a lead acid storage battery were manufactured and the penetration short-circuit evaluation was performed in a similar manner as in Comparative Example 1 except that the slurry B was changed to the slurry C.

Comparative Example 3

A separator and a lead acid storage battery were manufactured and the penetration short-circuit evaluation was performed in a similar manner as in Comparative Example 1 except that the slurry B was changed to the slurry D.

Comparative Example 4

A separator and a lead acid storage battery were manufactured and the penetration short-circuit evaluation was performed in a similar manner as in Comparative Example 1 except that the slurry B was changed to the slurry E.

Comparative Examples 5 to 16

Lead acid storage batteries were manufactured and the penetration short-circuit evaluation was performed in a similar manner as in Examples 1 to 8 and Comparative Examples 1 to 4 except that an electrode plate group was manufactured in a state in which the surface with a small average pore diameter in the separator was brought into contact with the unformed positive electrode plate, and the surface with a large average pore diameter in the separator was brought into contact with the unformed negative electrode plate.

Comparative Example 17

A separator and a lead acid storage battery were manufactured and the penetration short-circuit evaluation was performed in a similar manner as in Example 1 except that a single-layer separator obtained by performing sheet-making using only 500 g of slurry A was used.

Comparative Example 18

A separator and a lead acid storage battery were manufactured and the penetration short-circuit evaluation was performed in a similar manner as in Example 1 except that a single-layer separator obtained by performing sheet-making using only 250 g of slurry A was used.

A pore diameter and the thickness of each of a negative electrode side layer and a positive electrode side layer of the separator, the overall thickness (total thickness) of the separator, and penetration short-circuit evaluation results are shown in Table 1. In the separator of the examples, a retention rate of sulfuric acid (specific gravity: 1.28 and 1.31) at 20° C. is 1200% or more, and a retention property of water is 800% or less.

TABLE 1

|  | Negative electrode side layer (second layer) | | Positive electrode side layer (first layer) | | | |
| --- | --- | --- | --- | --- | --- | --- |
|  | Average pore diameter D2 (μm) | Thickness T2 (mm) | Average pore diameter D1 (μm) | Thickness T1 (mm) | Total thickness T (mm) | Penetration short-circuit evaluation |
| Example 1 | 4.4 | 0.45 | 12 | 0.16 | 0.61 | A |
| Example 2 | 4.4 | 0.45 | 26 | 0.14 | 0.59 | A |
| Example 3 | 4.4 | 0.45 | 58 | 0.15 | 0.6 | A |
| Example 4 | 4.4 | 0.45 | 105 | 0.16 | 0.61 | A |
| Example 5 | 4.4 | 0.31 | 12 | 0.3 | 0.61 | B |
| Example 6 | 4.4 | 0.31 | 26 | 0.29 | 0.6 | B |
| Example 7 | 4.4 | 0.31 | 58 | 0.28 | 0.59 | A |
| Example 8 | 4.4 | 0.31 | 105 | 0.29 | 0.6 | A |
| Comparative Example 1 | 4.4 | 0.15 | 12 | 0.45 | 0.6 | C |
| Comparative Example 2 | 4.4 | 0.15 | 26 | 0.47 | 0.62 | C |
| Comparative Example 3 | 4.4 | 0.15 | 58 | 0.42 | 0.57 | C |
| Comparative Example 4 | 4.4 | 0.15 | 105 | 0.43 | 0.58 | C |
| Comparative Example 5 | 12 | 0.16 | 4.4 | 0.45 | 0.61 | C |
| Comparative Example 6 | 26 | 0.15 | 4.4 | 0.45 | 0.6 | C |
| Comparative Example 7 | 58 | 0.14 | 4.4 | 0.45 | 0.59 | C |
| Comparative Example 8 | 105 | 0.12 | 4.4 | 0.45 | 0.57 | C |
| Comparative Example 9 | 12 | 0.3 | 4.4 | 0.31 | 0.61 | C |
| Comparative Example 10 | 26 | 0.29 | 4.4 | 0.31 | 0.6 | C |
| Comparative Example 11 | 58 | 0.28 | 4.4 | 0.31 | 0.59 | C |
| Comparative Example 12 | 105 | 0.29 | 4.4 | 0.31 | 0.6 | C |
| Comparative Example 13 | 12 | 0.45 | 4.4 | 0.15 | 0.6 | C |
| Comparative Example 14 | 26 | 0.42 | 4.4 | 0.15 | 0.57 | C |
| Comparative Example 15 | 58 | 0.43 | 4.4 | 0.15 | 0.58 | C |
| Comparative Example 16 | 105 | 0.42 | 4.4 | 0.15 | 0.57 | C |
| Comparative Example 17 | 4.4 | — | 4.4 | — | 1.1 | C |
| Comparative Example 18 | 4.4 | — | 4.4 | — | 0.62 | C |

REFERENCE SIGNS LIST

1: lead acid storage battery, 9: positive electrode plate (positive electrode), 10: negative electrode plate (negative electrode), 11, 100: separator, 110a: first layer, 110b: second layer.

The invention claimed is:

1. A lead acid storage battery comprising:
a positive electrode;
a negative electrode; and
a separator disposed between the positive electrode and the negative electrode,
wherein the separator contains a glass fiber and an organic binder,
the separator includes a first layer that is in contact with the positive electrode, and a second layer that is in contact with the negative electrode,
an average pore diameter of the first layer is larger than an average pore diameter of the second layer,
the average pore diameter of the first layer is more than 10 μm,
the average pore diameter of the second layer is 2 μm or more, and
a thickness of the first layer is equal to or less than half of an overall thickness of the separator.

2. The lead acid storage battery according to claim 1, wherein the average pore diameter of the first layer is more than 10 μm and 500 μm or less.

3. The lead acid storage battery according to claim 1, wherein the average pore diameter of the second layer is 2 μm to 8 μm.

4. The lead acid storage battery according to claim 1, wherein a thickness of the separator is 0.1 to 1.2 mm.

5. The lead acid storage battery according to claim 1, wherein the thickness of the first layer is 0.14 to 0.3 mm.

6. The lead acid storage battery according to claim 1, wherein a thickness of the second layer is 0.3 to 0.45 mm.

7. The lead acid storage battery according to claim 1, wherein the organic binder includes polypropylene.

8. The lead acid storage battery according to claim 1, wherein the separator is composed of the first layer and the second layer.

9. A separator for lead acid storage batteries,
wherein the separator is to be disposed between a positive electrode and a negative electrode in a lead acid storage battery including the positive electrode and the negative electrode,
the separator contains a glass fiber and an organic binder,
the separator includes a first layer that is in contact with the positive electrode, and a second layer that is in contact with the negative electrode,
an average pore diameter of the first layer is larger than an average pore diameter of the second layer,
the average pore diameter of the first layer is more than 10 µm,
the average pore diameter of the second layer is 2 µm or more, and
a thickness of the first layer is equal to or less than half of an overall thickness of the separator.

10. The lead acid storage battery according to claim 1, wherein a thickness of the second layer is more than 0.3 mm.

11. The lead acid storage battery according to claim 1, wherein a thickness of the second layer is 0.4 mm or more.

12. The separator for lead acid storage batteries according to claim 9, wherein the average pore diameter of the second layer is 2 µm to 8 µm.

13. The separator for lead acid storage batteries according to claim 9, wherein a thickness of the second layer is more than 0.3 mm.

14. The separator for lead acid storage batteries according to claim 9, wherein a thickness of the second layer is 0.4 mm or more.

* * * * *